United States Patent [19]

Velker et al.

[11] 3,879,450

[45] Apr. 22, 1975

[54] SALTS OF 3-HYDROXY-2-HYDROXYMETHYL-PROPANE-SULFONIC ACID-1

[75] Inventors: Eugen Velker, Dormagen-Hackenbroich; Francis Bentz; Helmut Reiff, Cologne, all of Germany

[73] Assignee: Bayer Aktiengesellschaft, Leverkusen, Germany

[22] Filed: May 18, 1973

[21] Appl. No.: 361,525

[30] Foreign Application Priority Data
May 18, 1972  Germany............................ 2224304

[52] U.S. Cl.... 260/513 R; 260/513 B; 260/29.2 TN; 260/75 NP; 260/77.5 AM
[51] Int. Cl............................................ C07c 143/02
[58] Field of Search ..................... 260/513 B, 513 R

[56] References Cited
UNITED STATES PATENTS

| | | | |
|---|---|---|---|
| 2,006,309 | 6/1935 | Clark | 260/106 |
| 2,653,970 | 9/1953 | Fessler | 260/513 B |
| 2,793,229 | 5/1957 | Blaser et al. | 260/513 B |
| 2,806,876 | 9/1957 | Blaser et al. | 260/513 B |
| 3,649,350 | 3/1972 | Agens | 117/160 R |

FOREIGN PATENTS OR APPLICATIONS

| | | | |
|---|---|---|---|
| 701,809 | 1/1965 | Canada | 260/513 B |

Primary Examiner—Leon Zitver
Assistant Examiner—Nicky Chan
Attorney, Agent, or Firm—Plumley & Tyner

[57] ABSTRACT

Salts of 3-hydroxy-2-hydroxymethyl-propane sulfonic acid-1 and a process for the preparation thereof by reaction of 2-methylene-propane-1,3-diol with a bisulfite under special conditions, the use of these salts as co-condensable substances as monomers for polyurethanes and as valuable intermediate products for other organic syntheses are disclosed.

3 Claims, No Drawings

SALTS OF 3-HYDROXY-2-HYDROXYMETHYL-PROPANE-SULFONIC ACID-1

This invention relates to salts of 3-hydroxy-2-hydroxymethyl-propane-sulfonic acid-1 and to a process for their preparation. The salts of 3-hydroxy-2-hydroxymethyl-propane-sulfonic acid-1 are obtained by the addition reaction of bisulfites to 2-methylene-propane-1,3-diol.

It is known that alkali metal bisulfites can be attached to double bonds which are activated by electron acceptor groups such as nitrile or ester groups (see R.T.E. Schenck and J. Danishefsky, J. Org. Chem. 16, 1683 (1951); O. Bayer, Ang. Chem. 61, 233 (1949) ). It is also known that bisulfites can be attached to aliphatic double bonds which are only weakly activated. It has been described in the literature, for example, that bisulfites can be attached to allyl alcohol (see M. S. Kharasch, E. M. May and F. R. Mayo, J. Org. Chem. 3, 175 (1939) ). 3-oxy-propane-sulfonic acid was obtained by this reaction in the form of its salts in a yield of only 30%. The yield obtained from the reaction of allyl alcohol and bisulfites has been increased (German Patent No. 915,693) but here again the formation of by-products could not by completely suppressed, and it is therefore assumed that the compounds obtained have the following structure:

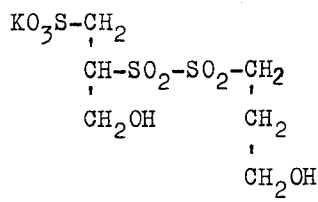

Moreover, the inorganic salts formed in the reaction are not completely removed from the sulfonate.

It is an object of this invention to provide new compounds which are useful as co-condensable compounds, as monomers for polyurethanes and as valuable intermediate products for other organic syntheses, for example for the production of easily dyeable polyester fibers.

Further objects will be evident from the following description and the example.

These objects are accomplished by a methyl-propane-sulfonic acid salts of the formula

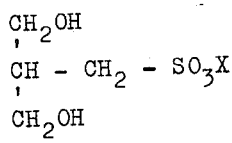

in which X represents $NH_4$ or an alkali metal.

It is another object of this invention to provide a process for the production of the abovementioned methyl-propane-sulfonic acid salts.

This object is accomplished by a process for the preparation of salts of 3-hydroxy-2-hydroxymethyl-propane-sulfonic acid-1, which comprises reacting 2-methlene-propane-1,3-diol with a bisulfite of the formula $$X\text{-}HSO_3$$

in which X represents $NH_4$ or an alkali metal said reaction being effected in an aqueous medium at temperatures of up to 100°C and within a pH-range of 3 – 9 in the presence of catalytically active oxygen, using a molar ratio of bisulfite to diol of between 1 : 1 and 5 : 1.

Said salts are obtained by this method in a simple manner and with a high degree of purity. Since in contrast, for example, to allyl alcohol, 2-methylene-propane-1,3-diol does not form any homopolymers and copolymerisation, e.g. with acrylonitrile, is also very difficult to carry out and only occurs with small proportions of 2-methylene-propane-1,3-diol, the double bond in 2-methylene-propane-1,3-diol must be regarded as much less reactive than the double bond in allyl alcohol.

It was therefore all the more surprising that, in spite of the lower reactivity of the double bond, the addition of bisulfites to 2-methylene-propane-1,3-diol to form 3-hydroxy-2-hydroxymethyl-propane-sulfonic acid salts proceeded with such high yields and without any side reactions being observed as in the case of the abovementioned disulfone compounds. The reaction may be represented by the following reaction scheme:

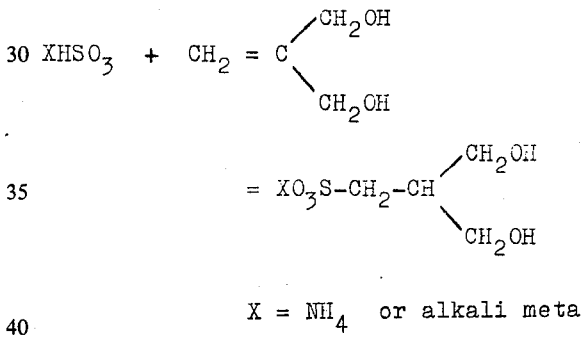

The diol used as the starting material may be prepared in known manner from isobutylene, glacial acetic acid and oxygen followed by saponification of the diacetal formed. The bisulfites used may be commercial bisulfite liquors or alternatively the bisulfites may be freshly prepared by introducing sulfur dioxide into aqueous ammonium hydroxide or alkali metal hydroxide solution. The addition reaction may be carried out at a temperature of up to 100°C, preferably at a temperature between −10°C and 70°C, most preferably at room temperature, by introducing 2-methylene-propane-1,3-diol or its aqueous solution dropwise into the bisulfite liquor. The molar ratio of bisulfite to diol used is between 1 : 1 and 5 : 1, preferably between 1.1 : 1 and 2 : 1. The oxygen used as catalyst for the reaction may be pure oxygen, atmospheric oxygen or taken from compounds which evolve oxygen such as hydrogen peroxide, care being taken to ensure that the oxygen is very finely divided in the reaction mixture, which can easily be achieved by using suitable stirrers. To obtain a high sulfonate yield, it is important to adjust the reaction solution to the correct pH, which should be between 3 and 9 and is preferably between 5 and 8. The reaction solution can be adjusted to the required pH by, for example, adding the appropriate quantity of ammonia or alkali metal hydroxide solution to the bisulfite solution. During the addition of the diol to the reaction solution, the pH changes towards alkaline, unless it is maintained at the required level by adding dilute acid or introducing more sulfur dioxide at the same time. After the addition of the diol, the end of the reaction is indicated by the fact that the pH remains the same. The heat evolved in the reaction may be removed by cooling if necessary. The major portion of the inorganic salts is advantageously removed by concentrating the solution to about half its volume and filtering the precipitated crystals. The remaining inorganic salts may then be removed from the required reaction product by extraction with alcohol/water mixtures. The sulfonate is obtained analytically pure in yields of up to 90% when the residue obtained after concentration of the alcoholic/aqueous solution by evaporation is recrystallised from alcohol. The salts of 3-hydroxy-2-hydroxymethyl-propane-sulfonic acid-1 obtained according to the invention are suitable e.g. for use as co-condensable compounds, as monomers for polyurethanes and as valuable intermediate products for other organic syntheses, for example, for the production of easily dyeable polyester fibers.

The preparation of a copolyester for fibers which can be dyed with basic dyes will now be described.

194.0 parts by weight of dimethyl terephalate, 186.0 parts by weight of ethylene glycol and 7.7 parts by weight of sodium-2-sulfonatomethyl-propane-1,3-diol mixed with 0.5 parts by weight of zinc acetate and 0.6 parts by weight of antimony trioxide are introduced into a reaction vessel equipped with an anchor stirrer, a gas inlet tube, a distillation attachment, a condenser, a vacuum attachment and a receiver. The reaction mixture is heated to 165°C under a stream of nitrogen and ester interchange is continued for 2 hours. The temperature is then raised to 280°C over a period of 2 hours. After terminating the nitrogen supply, the pressure is then slowly reduced to 0.03 mm Hg in the course of 1 hour. The rate of stirring must then be reduced from about 150 to about 20 revs per minute due to the continuous increase in the viscosity of the melt. Polycondensation is terminated after a further 3.5 hours. The polyester has a softening point of 252°0 – 264°C and a relative solution viscosity of $\eta_{rel} = 1.98$. The colourless, homogeneous, highly viscous melt is spun to threads by the melt spinning process. The stretched threads are dyed dark blue with a basic blue dye. The colour is wash-fast.

The following example is to further illustrate the invention without limiting it.

EXAMPLE 1

390 parts by weight of a commercial 40% sodium bisulfite liquor are adjusted to a pH of 7.05 with concentrated sodium hydroxide solution. Air is injected and the reaction solution is stirred so vigorously that it becomes milky cloudy due to the finely divided air bubbles. 88 parts by weight of 2-methylene-propane-1,3-diol in 38 ml of water are introduced dropwise over a period of ¾ – 1 hour at room temperature and, at the same time, the pH is kept between 7.0 and 7.1 by the dropwise addition of dilute sulfuric acid. The reaction is left to continue until no further change in pH can be observed. The reaction mixture is then acidified to approximately pH 3 with dilute sulfuric acid and the excess sulfur dioxide is driven out by stirring. After neutralisation with sodium hydroxide, the reaction mixture is evaporated to about half its volume and after leaving it to stand in a refrigerator for several hours, it is filtered to remove precipitated Glauber's salt. The filtrate is evaporated to dryness and the residue is boiled with 90% methanol. It is then filtered, the filtrate is evaporated and the residue then left behind is recrystallised from alcohol.

| Yield: | 142 parts by weight | | | | |
|---|---|---|---|---|---|
| Analysis: | $C_4H_9O_5SNa$ | (192.2) | | | |
| | C % | H % | O % | S % | Na % |
| Calculated: | 25.0 | 4.7 | 41.7 | 16.7 | 12.0 |
| Found: | 24.5 | 4.9 | 41.9 | 16.5 | 12.5 |
| | 24.4 | 4.8 | 42.0 | 16.3 | 12.2 |

What we claim is:
1. A compound of the formula

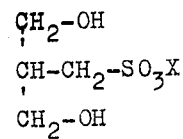

in which X represents $NH_4$ or an alkali metal.
2. The compound of claim 1 in which X is sodium.
3. The compound of claim 1 in which X is $NH_4$.

* * * * *